UNITED STATES PATENT OFFICE.

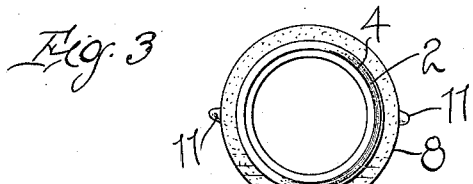
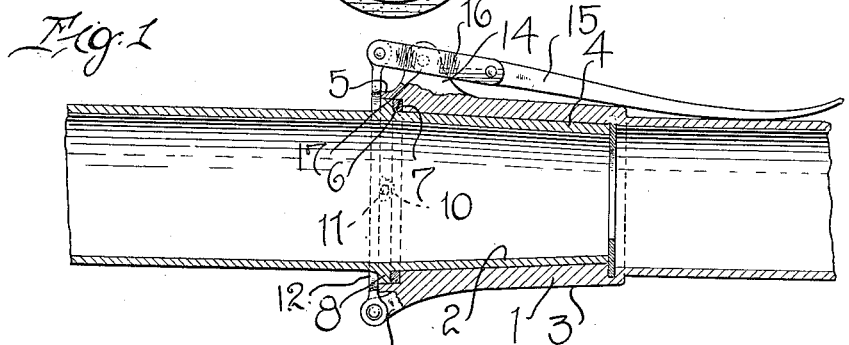
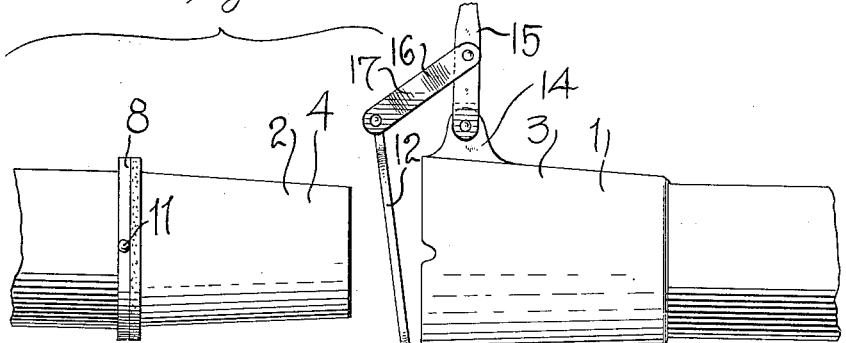
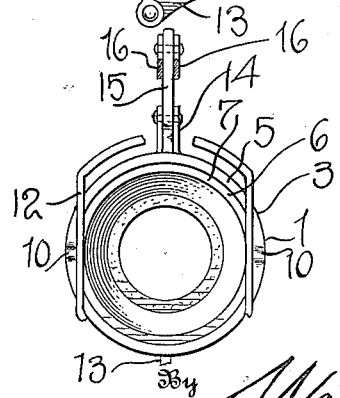

ALBERT RELITZ, OF RETAH, MONTANA.

HOSE-COUPLING.

1,143,136.  Specification of Letters Patent.  Patented June 15, 1915.

Application filed June 24, 1914. Serial No. 847,089.

*To all whom it may concern:*

Be it known that I, ALBERT RELITZ, a citizen of the United States, residing at Retah, in the county of Dawson and State of Montana, have invented certain new and useful Improvements in Hose-Couplings, of which the following is a specification, reference being had to the accompanying drawings.

This invention relates to new and useful improvements in hose couplings and more particularly to a quick detachable coupling, the main object of the present invention being the provision of a hose coupling of the above character whereby two sections of hose may be quickly and readily attached together or detached, or wherein one section of hose may be quickly and readily attached to a hydrant or other supply source.

Another object of the present invention is the provision of a hose coupling of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a longitudinal sectional view of a hose coupling constructed in accordance with my invention, illustrating parts thereof in their locked position. Fig. 2 is a side elevation of the device in its disconnected state. Fig. 3 is an end elevation of the male portion of the coupling; and Fig. 4 is an end elevation of the female portion.

Referring more particularly to the drawing, 1 indicates the female section of my improved hose and the numeral 2 indicates the male section. The female section 1 is provided with a substantially funnel-shaped mouth 3 adapted to receive the outer conical end 4 of the male section 2. The outer end of the funnel-shaped mouth 3 is provided with a shoulder 5 and formed contiguous with the shoulder is an annular recess 6 terminating in a shoulder 7, the purpose of which will be hereinafter more fully set forth. Formed upon the male section 2, is an annular flange 8 which is adapted to be arranged within the mouth of the female section and mounted upon the cone-shaped portion 4 and bearing against the flange 8, is a washer 9, the outer periphery of which is adapted to be yieldably arranged within the recess 6 of the female section and retained therein by means of the shoulder 7.

In order to retain the hose section against rotary movement, with respect to each other, suitable recesses 10 are formed in the outer edge of the mouth 3 and arranged in opposed relation for the reception of the oppositely disposed lugs 11 formed upon the male section 2. These lugs 11 are securely retained within the recesses 10 by means of an oval retaining member 12 formed of two separable sections, preferably semi-oval in form, the ends of which are arranged at right angles to the body portion and one end of each of the sections being pivotally connected to the ear 13 which is formed upon the outer surface of the mouth portion 3. Pivotally connected to the ear 14 which is formed upon the mouth portion 3, opposite the ear 13, is a lever 15 which is pivotally connected to the outer ends of the members forming the retaining member 12 by means of the links 16.

From the above it will be apparent that in connecting the two hose sections together, the cone-shaped portion of the male section is inserted within the mouth 3 of the female section and pressed inwardly until the washer 9 engages within the recess 6. It will be noted that in placing the male section within the mouth of the female section, the lugs 11 will be disposed at right angles with respect to the position they assume after the funnel member has been inserted within the mouth. After the male section is in position, the lever 15 is actuated to engage the side portions of the member 12 with the lugs and force them into the recesses 10, so as to retain the hose sections against rotary movement and also against longitudinal movement. It will be noted that by having the central portions of the link members 16 bowed, as shown at 17, they will be disposed upon opposite sides of the ear 14, when the device is in its closed position and assist in retaining the lever in its locked position and prevent the same from becoming accidentally unlocked.

From the above it will be noted that I have provided a simple and durable hose coupling whereby two sections of hose may be quickly and readily connected together or disengaged and wherein one section of hose may be quickly connected to a hydrant or detached therefrom. It will also be apparent that the device is extremely simple in construction and can be manufactured of such material that the same may be placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a female section having a funnel-shaped mouth portion provided at its outer end with opposed recesses, a male member having a cone-shaped end adapted to be inserted within the funnel-shaped mouth, opposed lugs formed on said male member adapted to be arranged within said recesses, and movable means carried by the female section adapted for engagement with the lugs to retain the sections in their locked positions.

2. A device of the class described including a female member having a funnel-shaped mouth, an annular shoulder formed therein, said mouth being further provided with a recess contiguous with the shoulder, said mouth having opposed recesses formed in the outer end thereof, a male member, opposed lugs formed on said male member and adapted to be disposed within said recesses, an oval-shaped retaining member pivotally mounted upon the outer end of the female member adapted for engagement with said lugs to retain the sections in their effective position, and means whereby to actuate said retaining member to secure the same in its locked position.

3. A device of the class described including a female member having a funnel-shaped mouth portion and provided with opposed recesses at its outer end, an annular shoulder formed within said mouth portion, a retaining rib formed at the outer end of the mouth portion and providing a recess between the shoulder and rib, a male member adapted for insertion within the funnel-shaped mouth portion, an annular flange, a washer mounted upon the end of the male member and adapted to be arranged within the recess, opposed lugs carried by the male member and adapted for insertion within the recess to prevent turning movement of the sections, an oval-shaped retaining member having one end pivotally connected to the funnel-shaped mouth portion, an actuating lever pivotally connected to the opposite side of the funnel-shaped mouth portion, and link members pivotally connecting the outer end of the retaining member with the lever, whereby said retaining member will be manually forced against the lugs to retain the same within the recesses and prevent rotary or longitudinal movement of the coupling sections.

4. A device of the class described including a female section having a mouth portion provided at its outer end with recesses, a male member adapted to be inserted within the mouth, lugs formed on said male member adapted to be arranged within said recesses, and movable means carried by the female section adapted for engagement with the lugs to retain the sections in their locked position.

In testimony whereof I hereunto affix my signature in the presence of two witnesses.

ALBERT RELITZ.

Witnesses:
PETER A. RICHERT,
S. B. UNRICH.

Copies of this patent may be obtained for five cents each, by addressing the "Commissioner of Patents, Washington, D. C."